Nov. 10, 1925.
J. F. O'CONNOR
1,560,843
FRICTION SHOCK ABSORBING MECHANISM
Filed Nov. 13, 1922     2 Sheets-Sheet 1
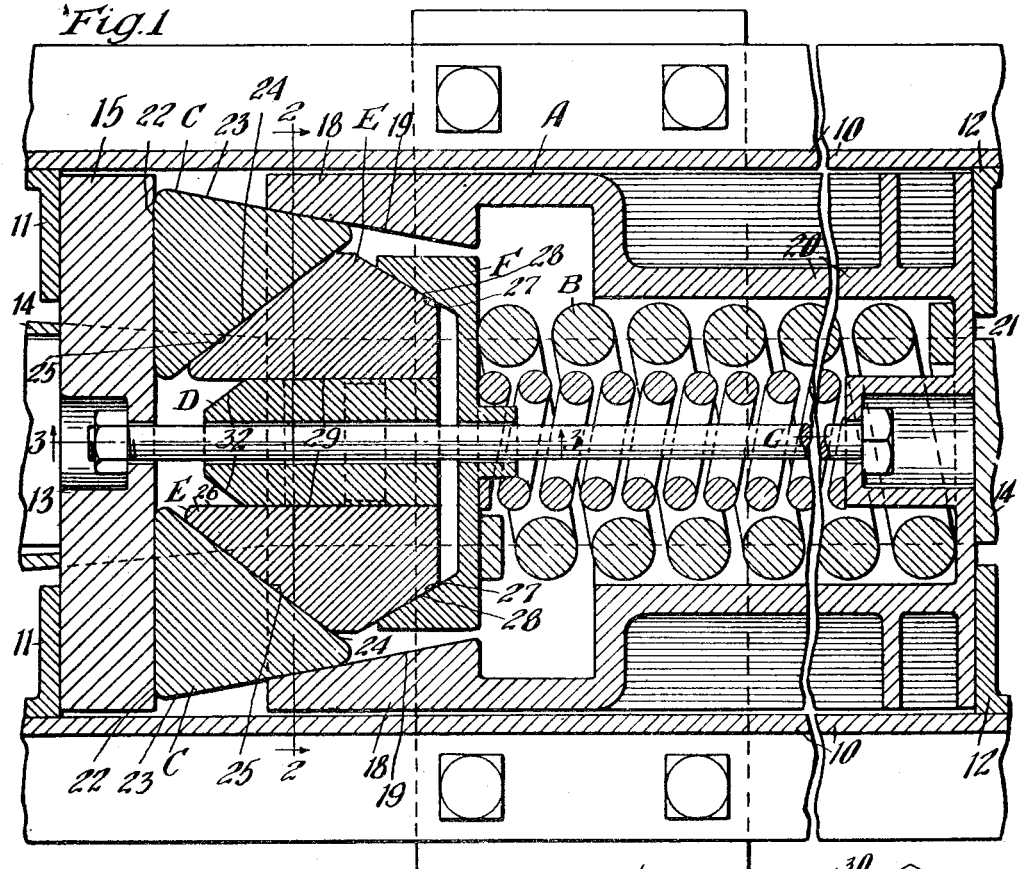
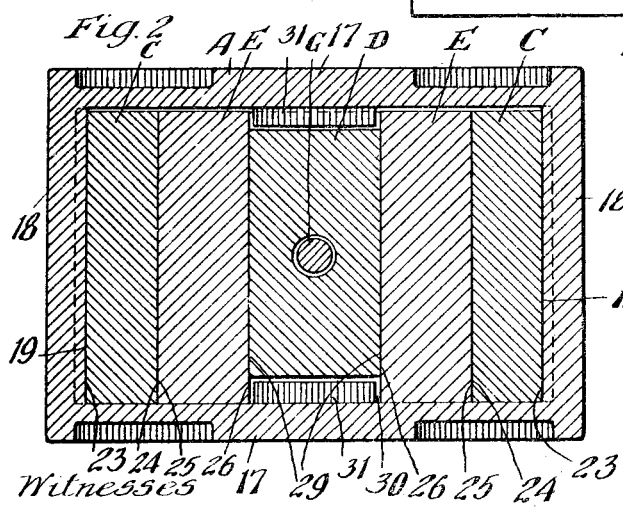
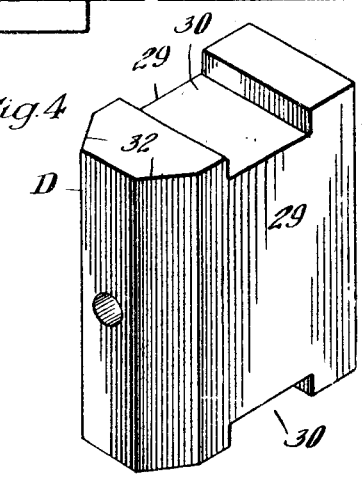
Inventor
John F. O'Connor
By Geo. I. Haight
his Atty.
Witnesses
Wm. Geiger

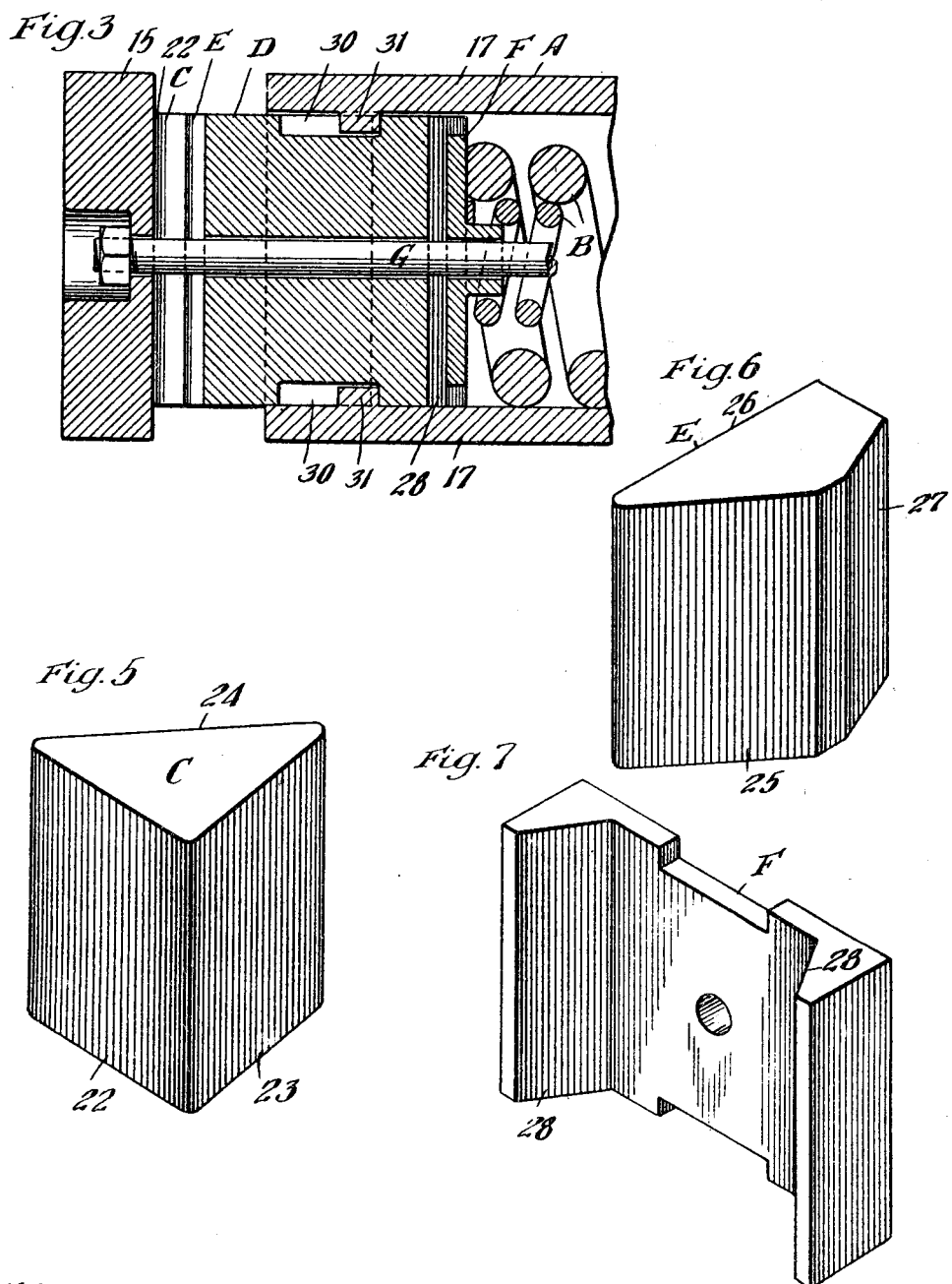

Patented Nov. 10, 1925.

1,560,843

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed November 13, 1922. Serial No. 600,562.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a high capacity friction shock absorbing mechanism especially adapted for railway draft riggings wherein the friction elements are so designed that a differential action of one type is induced during an early portion of the compression stroke for a predetermined distance, followed by a different and double differential action for the remainder of the compression stroke.

A specific object of the invention is to provide in a friction gear of the differential type, means whereby one set of elements operates substantially as a solid unit for a predetermined portion of the compression stroke, after which said elements operate as independent elements with a consequent increase in the number of friction surfaces brought into play during the final portions of the compression stroke.

Other objects of the invention will more clearly appear from the description and claims hereinafter following. In the drawings forming a part of this specification, Figure 1 is a horizontal longitudinal sectional view of a portion of a railway draft rigging showing my improvements in connection therewith, parts being broken away to better accommodate the figure on the sheet. Figure 2 is a vertical transverse sectional view of the shock absorbing mechanism proper corresponding to the section line 2—2 of Figure 1. Figure 3 is a vertical longitudinal sectional view corresponding to the section line 3—3 of Figure 1. And Figures 4, 5, 6 and 7 are detail perspectives of a partition employed with the shell, an outer wedge-friction-shoe, an inner wedge-friction-shoe, and a wedge-spring follower, respectively.

In said drawings, 10—10 denote channel draft sills of a car underframe, to the inner faces of which are secured front stop lugs 11 and rear stop lugs 12. A portion of a drawbar is indicated at 13, the same being operatively associated with a hooded cast yoke 14 within which is disposed the shock absorbing mechanism proper and a front follower 15. The yoke and parts therewithin are supported in operative position by a detachable saddle plate 16.

The improved shock absorbing mechanism proper, as shown, comprises, broadly, a combined friction shell and spring cage casting A; a spring resistance B; two outer wedge-friction-shoes C—C; a floating partition D; two inner wedge-friction-shoes E—E; a wedge-spring follower F; and a retainer bolt G.

The casting A is provided at its front or outer end with a friction shell proper defined by top and bottom walls 17—17 and side walls 18—18, the latter being provided on their inner sides with friction surfaces 19—19 which are converged inwardly of the shell at an appreciable taper. Rearwardly of the shell proper, the casting A is necked inwardly to provide a spring cage or casing 20 to house and center the spring B. At its rear end, the casting A is formed with an integral vertical wall 21 laterally extended and suitably reinforced to adapt it to act as the rear follower of the mechanism in conjunction with the stop lugs 12.

The two outer wedge-friction-shoes C—C are of like construction but oppositely arranged. Each is formed with a front transversely extending flat friction surface 22, an outer or side friction surface 23 and an inner wedge-friction surface 24, said surfaces 22, 23 and 24 frictionally cooperating with the front follower 15, a shell friction surface 19 and an inner wedge-shoe E, respectively.

The two inner wedge-friction-shoes E are of like construction but oppositely arranged, each having a front wedge-friction surface 25, an inner longitudinally extending flat friction surface 26, and an inner wedge face 27. The wedge face 25 cooperates with the wedge face 24 of the corresponding shoe C and the friction surface 26 cooperates with the floating partition D, in the manner hereinafter described. The two wedge surfaces 27 of the shoes E, which converge inwardly of the shell, cooperate with correspondingly arranged wedge faces 28—28 provided on the forward side of the spring follower F.

The floating partition D is in the nature of a heavy block having opposed parallel side friction surfaces 29—29 cooperable with the respective friction surfaces 26 of the shoes E. On its top and bottom edges, the partition D has transversely extending relatively wide grooves 30—30 within which extend narrower ribs 31—31 formed on the inner faces of the top and bottom walls 17—17 of the casting A, as best shown in Figure 3. With this construction, it is evident that the partition D is allowed longitudinal movement with respect to the casting A for a limited distance, as will appear from an inspection of Figure 3. At its front end, the partition D is beveled as shown at 32—32 to provide the necessary clearance for the wedge-shoes C at the end of the compression stroke.

The retainer bolt G is anchored at its inner end within a suitable hollow boss formed integral with the casting A and at its forward end within a recess provided in the front follower 15. The two followers 15 and F are suitably apertured to accommodate the shank of the bolt.

The operation of the mechanism during a compression stroke, assuming a buffing movement of the drawbar, is as follows. As the front follower 15 is moved inwardly, the two wedge-shoes C are forced rearwardly at the same rate and as the wedge-shoes C travel down the inclined shell friction surfaces 19, lateral movement toward each other will be imparted to the shoes C, thus creating friction not only between the shoes C and the shell but also between the shoes C and the follower 15. During the early part of the compression stroke, a differential action will be imparted to the two wedge-shoes E and the floating partition D, which will act substantially as a solid unit, which unit will be advanced longitudinally at a faster rate than the follower 15, due to the lateral movement imparted to the shoes C. This action of the three-part unit referred to will be yieldingly resisted by the spring B acting through the follower F and continues until the floating partition D is prevented from further movement longitudinally of the casting A. For the remainder of the stroke, it is evident that the lateral approach of the wedge-shoes C will continue and consequently the wedge-shoes E will be forced to travel inwardly of the then stationary floating partition D. During the entire movement of the wedge-shoes E, it is evident that they will be gripped at their inner ends by the follower F so that the pressure and friction between the shoes E and the floating partition D will be distributed throughout the entire area of the contacting surfaces thereof. Upon discontinuance of the actuating force, the three elements E and D will travel outwardly as a unit until the partition D engages with the ribs 31 and further outward movement thereof is prevented. By this time, the wedge-shoes C will obviously have been loosened so that the balance of the outward movement of the shoes E with respect to the floating partition will be imparted thereto without danger of sticking by the follower F under the influence of the spring B.

From the preceding description, it will be seen that, during the first part of the compression stroke, I obtain a differential action of one character and, during the balance of the compression stroke, a different differential action of increased capacity, thereby providing a graduated resistance well arranged to absorb the multiplicity of relatively small shocks as well as the more infrequent heavy shocks without unnecessary wear of the parts.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having inwardly converged friction surfaces; of a spring resistance; an outer follower; a plurality of friction members cooperable with the shell, follower and each other, to produce a differential action of one character during a portion of the compression stroke; and means, operable during the balance of the compression stroke, for producing a differential action of a different character.

2. In a friction shock absorbing mechanism, the combination with a friction shell having inwardly converged friction surfaces; of a spring resistance; an outer follower; wedge-friction-shoes cooperable with said shell and follower; a plurality of friction elements co-operable with said shoes and including a floating friction post, said post being movable inwardly of the shell during a compression stroke; and means limiting the inward movement of said post with respect to the shell to less than a full compression movement.

3. In a friction shock absorbing mechanism, the combination with a friction shell having inwardly converged friction surfaces; of a spring resistance; an outer follower; wedge-friction-shoes cooperable with said shell and follower; secondary wedge-friction-shoes cooperable with said first named friction shoes; a friction member interposed between said secondary shoes and upon which the latter are adapted to slide, said friction member being mounted to move relatively to the shell during a compression stroke a distance less than the full compression stroke; and means interposed between said spring resistance and secondary shoes for pressing the latter against said friction member.

4. In a friction shock absorbing mechanism, the combination with a friction shell having opposed interior inwardly converged friction surfaces; of a spring resistance; an outer pressure-transmitting follower; a pair of outer wedge-friction-shoes interposed between said follower and the shell and cooperable with both; a centrally disposed friction partition within the shell and mounted for limited movement longitudinally thereof during a compression stroke; and additional friction shoes, one on each side of said partition, interposed between the latter and the first named friction shoes and cooperable therewith, said shoes being movable in unison with said post during a portion of the compression stroke, and relatively movable to said post during the remainder of said stroke.

5. In a friction shock absorbing mechanism, the combination with a friction shell having a pair of opposed inwardly converged friction surfaces; a spring resistance; an outer pressure-transmitting follower; a centrally disposed partition within the shell having friction surfaces on each side thereof and adapted for limited movement with respect to the shell longitudinally thereof during a compression stroke of the mechanism; an outer pair of wedge-friction-shoes, each cooperable with the follower and one of the shell friction surfaces; a pair of inner wedge-friction-shoes, one on each side of said partition and frictionally cooperable therewith and with the corresponding outer friction shoe; and a spring follower interposed between the spring resistance and said inner friction shoes and having wedge gripping engagement with the inner ends of the latter.

In witness that I claim the foregoing I have hereunto subscribed my name this 11th day of October, 1922.

JOHN F. O'CONNOR.